United States Patent
Sintchak

[19]

[11] Patent Number: 5,916,351
[45] Date of Patent: Jun. 29, 1999

[54] MODULAR BEVERAGE BREWING SYSTEM WITH INTERLOCKING ASSEMBLY

[75] Inventor: Ivan Sintchak, Orinda, Calif.

[73] Assignee: Hamilton Beach—Proctor Silex, Inc., Glen Allen, Va.

[21] Appl. No.: 08/748,792

[22] Filed: Nov. 14, 1996

Related U.S. Application Data

[63] Continuation of application No. 08/555,982, Nov. 13, 1995, abandoned.

[51] Int. Cl.[6] .................................................. A47J 31/00
[52] U.S. Cl. .............................. 99/284; 99/288; 99/290; 99/304; 99/316; 99/279
[58] Field of Search ............................. 99/279, 288, 286, 99/291, 290, 316, 284, 289 R, 302 R, 295, 287, 292, 304; 312/257.1, 228

[56] References Cited

U.S. PATENT DOCUMENTS

| | | | |
|---|---|---|---|
| 3,218,955 | 11/1965 | Lorang | 99/281 X |
| 4,054,085 | 10/1977 | Tarr | 99/284 |
| 4,757,753 | 7/1988 | Pandolfi | 99/290 |
| 4,829,888 | 5/1989 | Webster et al. | 99/284 |
| 4,892,031 | 1/1990 | Webster et al. | 99/284 |
| 5,217,288 | 6/1993 | Johnson | 99/304 X |

*Primary Examiner*—Reginald L. Alexander
*Attorney, Agent, or Firm*—Darby & Darby

[57] ABSTRACT

A beverage brewing apparatus in which all of the electrical and mechanical components necessary for a brewing operation are contained in a modular tower having a cantilevered head section at the top thereof. The modular tower is mountable directly on a supporting modular base or on a modular riser which is, in turn, mounted on a modular base to thereby allow the apparatus to accommodate a variety of beverage delivery vessels and/or brew cones. Additional supporting modules, such as warming modules, are also disclosed to provide selectable brewing apparatus configurations to meet the many needs of the user. The components of the apparatus are joined together by an interlocking assembly in which a pair of in-turned flanges on opposing sides of the bottom of an upper component are held in corresponding outwardly directed channels in a lower component. A riser plate which forms one side of an upper component is removably attached to an upward flange on a lower component to secure the components in place.

12 Claims, 3 Drawing Sheets

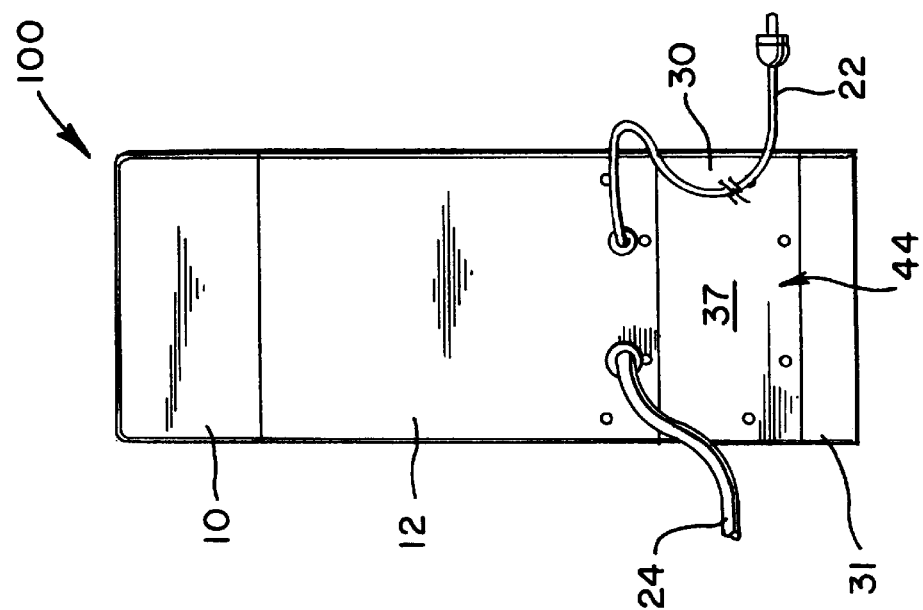
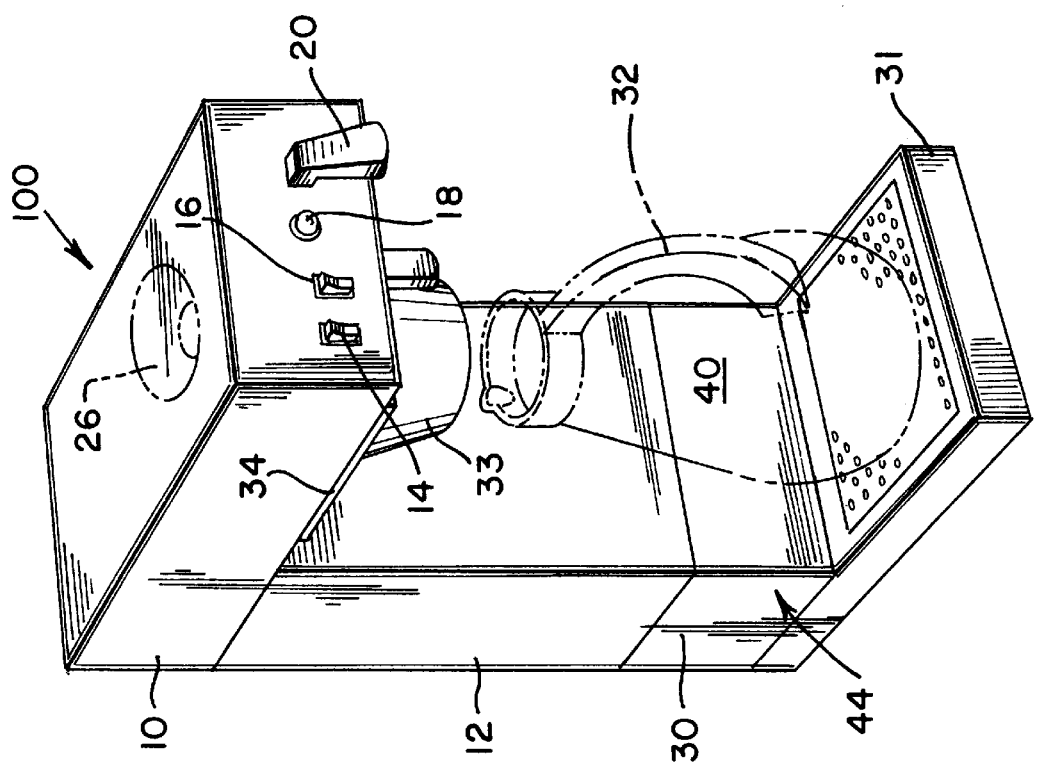

MODULAR BEVERAGE BREWING SYSTEM WITH INTERLOCKING ASSEMBLY

This is a continuation of application Ser. No. 08/555,982, filed Nov. 13, 1995 now abandoned.

BACKGROUND

1. Field of the Invention

This invention relates to a beverage brewing apparatus, in general, and to a modular brewing apparatus having an interlocking modular assembly that enables the brewing apparatus to be simply and easily configured to maximize the adaptability of the brewing apparatus for the needs of the manufacturer, the distributor and end user, in particular.

2. Prior Art

Many forms of beverage brewing apparatus are in common use in commercial as well as consumer settings. The popularity of the beverage brewing apparatus is due to its ability to make a freshly brewed beverage directly from brewing materials, such as coffee grounds, tea leaves and the like. The consuming public greatly prefers the quality of such freshly brewed beverages over instant beverages made from dehydrated concentrates.

Beverage brewers of varying degrees of complexity are available on the market. Some beverage brewers are designed for direct connection to an external plumbing system to prepare and deliver hot water without the user having to fill a reservoir. Other brewers, frequently referred to as "pour-over" brewers require the user to pour unheated water into a receptacle for subsequent heating. The internal operating mechanisms of these brewers are similar and, typically, include a water heating tank, heating coils, and suitable controls for energizing the heating coils to heat the water and de-activating the coils when the correct water temperature has been obtained. An internal plumbing system delivers cold water to the tank for heating and delivers hot water from the tank for beverage brewing.

Because of the widespread use of such beverage brewing apparatus, it is desirable to provide an apparatus which can accommodate a variety of space limitations, site locations and market conditions. For example, if a brewer is used by a restaurant, it would be beneficial for the user to be able to adapt the brewing apparatus to a variety of space limitations so that the brewer may be located in various locations at the option of the user. When the needs of a user change, it is often desirable that the brewing apparatus be modifiable to fulfill those needs. However, this modification is not easily accomplished with currently available devices. Furthermore, the requirements of the user may change due to new developments in the industry or due to new preferences of the beverage consumers. It is desirable that the existing brewing apparatus be changed to accommodate the new preferences in order to avoid the obsolesce of existing units as the industry changes. Again, because of the construction of existing equipment, this change is not easily accomplished and may even be impossible in some cases.

With the state of the art devices, a manufacturer of beverage brewing apparatus is required to produce a large number of machine styles and configurations. Consequently, a large number of fixed-configuration machines must be maintained in inventory to accommodate a variety of settings.

For example, in settings where additional warming units or storage units for beverage vessels are desired, a variety of side units may be required to adapt the brewer apparatus to the specific setting. For example, the warming or storage units can be disposed on each side of a central brewer unit or, conversely, on the right or left side of the brewing unit.

Another consideration is the quality of the beverage brewed and the tidiness of the brewing process. If the brewed beverage must travel a significant distance before entering a vessel, the beverage has a longer time for reacting with the surrounding atmosphere. This reaction may lower the quality of the beverage. In addition, the greater the distance between the brewing funnel or brewing cone and the vessel, the greater the chance that the beverage will spatter or splash. This often results in an unkempt appearance of the area surrounding the brewing apparatus as well as posing a danger to the user. In view of the large variety of shapes and sizes of vessels available and being used in commercial practice, these problems frequently occur. In many cases, the commercial brewing apparatus user has a brewing apparatus which is impossible to adjust or modify to accommodate a variety of vessels. Alternatively, the user must maintain an inventory of many different units to accommodate the needs of each setting and each size vessel. Such an inventory can be quite expensive.

Clearly, the user (as well as the manufacturer and/or distributor) would prefer to maintain a smaller inventory of brewing devices which are easily modified to meet the various needs. Minimizing the number of parts among various models of brewing apparatus would reduce the expense and complexity of the manufacturing process, the parts inventories and the overall production costs. Minimizing the number of different parts, along with providing a brewing apparatus that is easily modifiable to a desired configuration, also simplifies field installation, field repair and field training. Furthermore, a minimized parts requirement allows a field representative to more easily, more completely, and more rapidly respond to the changing needs of the commercial user with only a minimum, if any, interruption in service.

SUMMARY OF THE INVENTION

It is, therefore, an object of the present invention to provide a modular beverage brewing apparatus which maximizes the adaptability of the brewing apparatus and reduces the inventory of parts required to satisfy the needs of the manufacturer, the distributor, the servicer and the end user.

Another object of the present invention is to reduce the number of separate types or styles of beverage brewing apparatus required to be manufactured to meet customer requirements.

Another object of the present invention is to allow the modification of the beverage brewing apparatus to function with a multiplicity of beverage delivery vessels.

Another object of the present invention is to provide a beverage brewing apparatus having a standard interface between all towers and supporting units which allows the assembly of mass produced components.

The invention comprises a modular beverage brewing apparatus in which all of the electrical and mechanical components necessary for an automatic brewing operation are contained in a modular tower having a brew head mounted at the top of a support section. The modular tower is mountable directly on a modular base element or, alternatively, on supporting modular riser elements which are, in turn, mounted on the modular base element. This arrangement allows the brewer apparatus to accommodate a variety of beverage delivery and/or storage vessels. Additional modules, such as warming modules, grinding modules or the like, are also contemplated and can be selectively combined with the basic brewer apparatus in order to provide selectable brewer configurations to meet the varying needs of the user.

The modules are joined together by an interlocking assembly in which a pair of flanges at one surface of one module are engaged in corresponding channels in another surface of another module. A riser plate is removably attached to at least one side of the riser module in order to secure adjacent modules in place.

BRIEF DESCRIPTION OF THE DRAWINGS

FIG. 1 is an oblique view of one embodiment of a modular beverage brewing apparatus according to the present invention.

FIG. 2 is a rear elevation view of the modular beverage brewing apparatus shown in FIG. 1.

DESCRIPTION OF THE PREFERRED EMBODIMENT

Figure 3:
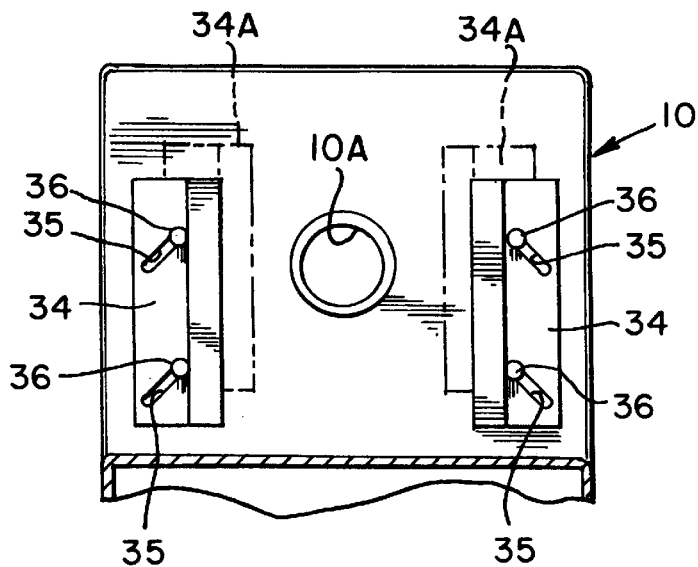
FIG. 3 is a plan view of adjustable brew cone rails on the underside of a brew head to accommodate brew cones of varying widths.

Referring now FIG. 1, there is shown one embodiment of a beverage brewing apparatus 100 of the present invention. The apparatus includes a tower, which includes a support 12, having a cantilevered head section 10 mounted thereon. The cantilevered head section 10 and the support section 12 form a single modular tower unit which contains all of the electrical and mechanical components (not shown) necessary for an automatic brewing operation. These components can include an internal plumbing system for delivering cold water to the water heating tank and hot water from the tank for beverage brewing, heating coils, controls for energizing the heating coils and shutting off the coils when the correct water temperature has been obtained and so forth. As is common practice in the art of beverage brewing apparatus, the water heating tank is regulated by a variety of controls, such as thermostat, water supply valve, timer and related electronic components which control the heating and dispensing of the water in a well-known manner. Since numerous implementations of these electrical and mechanical components and the operation thereof in beverage brewing apparatus are well-known, further details of the internal electrical and mechanical components of the tower unit need not be described herein.

In the apparatus illustrated in FIG. 1, the front panel of the cantilevered head section 10 includes a power (ON/OFF) switch 14 for activating the unit, a brew switch 16 for starting the brewing cycle and a ready-to-brew indicator 18. Typically, indicator 18 is a light device. An optional faucet 20 can be included in head 10 to provide hot water for various uses, for example, the preparation of tea, cocoa or the like, separate from the brew cycle. It will be recognized that additional controls may be incorporated in the modular tower unit within the concept of the present invention.

As shown in FIG. 2, an electrical power cord 22 extends from the rear of the support section 12 of the tower for providing electrical power to the beverage brewing apparatus. Any electrical power required for the operation of additional modular units, such as warming units, will, normally, be provided via the tower unit. The bottom of the support section 12 is provided with openings and/or connections (not shown) to allow electrical power to be coupled to other modular units, such as base units 31, riser units 44 or warming units (see FIG. 6) which have corresponding interior openings and/or electrical power connections.

For plumbed models, a water line 24 is provided in order to supply water to the brewer for automatic brewing in a conventional manner. The water line 24 is connected to the tower via conventional fittings.

Alternatively (see FIG. 1), the cantilevered head section 10 may include an opening 26 through the top thereof to receive cold water to enable "pour-over" type operation in a conventional manner.

In the embodiment shown in FIG. 1, support section 12 is mounted on a modular riser element 30 which is, in turn, mounted on a base element 31. It must be understood that the tower can be mounted directly on the base module. The support section 12 of the tower, when mounted directly on the base element 31, is, typically, of a height that positions the head to accommodate an industry standard glass vessel. However, the modular riser element 30 raises the tower and, thus, increases the height of the cantilevered head section 10 of the tower relative to the base element 31. (As shown in FIG. 1, a conventional drip base is illustrated. A heater base is equally useful in another embodiment.) Use of the riser 31 permits the brewer apparatus to accommodate a tall vessel such as an airpot 32 shown in phantom below a brewer cone 33. The brew cone 33 is slidably mounted on the underside of the head 10 by cone rails 34.

The height of the head 10 above the top surface of the base element 31 may, thus, be selected by employing (or not) a riser elements 30. Of course, riser elements of various heights can be used in order to position head section 10 at the desired height to accommodate a specific beverage receiving vessel or brew cone. Thus, the present invention envisions a tower of a unitary design capable of being mated with a variety of riser units 30 and, as well, a variety of base units 31 to provide a beverage brewing apparatus having the particular characteristics required by the end user at any time.

The present invention also envisions a variety of tower units for accommodating a variety of brewing options. For example, the tower unit may be designed to automatically provide the 64 oz. brewing volume of the standard glass carafe or may be designed to provide a greater or lesser volume depending on the requirements of the user. Alternatively, the volume of heated water provided by the tower unit may be selectable through internal or external settings of tower unit.

In a tower having selectable brewing volume, it is advantageous that the brew cone rails be adjustable to accommodate either a standard (brew-through) or wide (bypass) brew cone.

Referring now to FIG. 3, there is shown the under side of the head 10 with adjustable brewing cone rails 34 mounted thereon. The rails 35 are mounted adjacent to a conventional water dispensing fitting 10A in head 10 which supplies water to the brew cone 33 (see FIG. 1). The rails 34 are slidably mounted on pin fasteners 36 which extend downwardly from the underside of head 10. In particular, each of the adjustable brew cone rails 34 includes a plurality of parallel, diagonal slots 35 therethrough. The slots 35 are configures such that the rails are adjustable between a wide cone position as shown in solid outline, and a narrower cone position in which the rails are positioned closer together, as shown in phantom outline 34A. Thus, brew cones of different widths can be accommodated in the same head.

Figure 4:
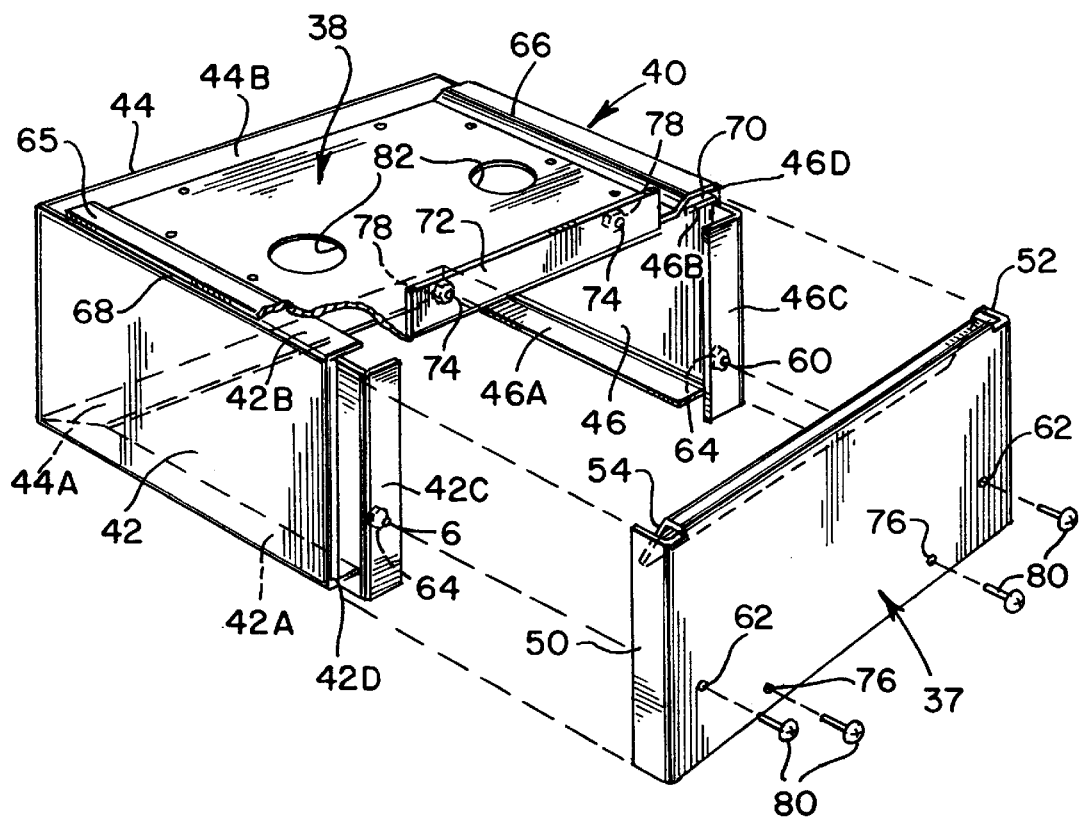
FIG. 4 is a partially exploded, perspective view of a modular riser element according to the present invention illustrating the assembly thereof.

Referring now to FIG. 4, there is shown an exploded view of one embodiment of the modular, interlocking riser module 30 assembly of the present invention. The riser module 30 includes riser plate 37, a joiner plate 38 and a unitary frame 40 which, in a preferred embodiment, can be formed from a single stainless steel plate.

As shown in FIG. 4, frame 40 provides three sides of the riser 30, namely, left sidewall 42, rear sidewall 44 and right sidewall 46. Frame 40 also provides inward-directed horizontal flanges 42A, 44A and 46A at the base of sidewalls 42, 44 and 46, respectively. Similarly, inward-directed, horizontal flanges 42B, 44B and 46B are provided at the top of sidewalls 42, 44 and 46, respectively.

In a preferred embodiment, the forward ends of sidewalls 42 and 46 are also bent to provide inward-directed, vertical flanges 42C and 46C, respectively. The forward ends of sidewalls 42 and 46 are also bent to provide indented shoulders 42D and 46D to allow the sidewalls to smoothly mate with vertical flanges 50 and 52 on the riser plate 37. The riser plate 37 can be selectively affixed to the frame 40 at the front ends of sidewalls 42 and 46 to provide the fourth side of the riser 30. Riser plate 37 includes a downward-directed lip 54 which is adapted to be positioned over the flanges 42C and 46C of the frame 40 when plate 37 is joined to the frame. When the riser plate 37 is disposed on the unitary frame 40, the side flanges 50 and 52 are disposed over and engage the indented areas 42D and 46D of sidewall 42 and sidewall 46, respectively.

Each of the vertical flanges 42C and 46C of the frame 40 includes an aperture 60. The riser plate 37 includes corresponding apertures 62. Nuts 64 are affixed (e.g. welded) to the inner surface of the unitary frame at the apertures 60 for receiving screws 80 which pass through apertures 62 and apertures 60 to secure the riser plate 37 in place as the front wall of the modular assembly 30.

The joiner plate 38 is disposed as the top surface of the modular unit 30. The joiner plate 38 is affixed, for example, by spot welding, to the inner portions of inward-directed upper flanges 42B, 44B and 46B of the walls 42, 44 and 46. Alternatively, joiner plate 38 may be removably attached to the frame 40 by using screw/nut fasteners, self-tapping screws or the like, through apertures in the joiner plate 38 and in the flanges 42B, 44B and 46B.

The outer edges 65 and 66 (i.e. outside of the spot welds or other joiners) of the joiner plate 38 are parallel to provide channels 68 and 70, respectively. The channels 68 and 70 are adapted to receive the inward-directed flanges 42A and 46A of another modular unit. The modular unit may be a riser 30, a tower 12 or any other suitably constructed modular unit.

The joiner plate 38 is also provided with an upward-directed flange 72 at the front, rear or both ends of plate 38. The flange 72 of the joiner plate 38 is provided with apertures 74 which correspond with apertures 76 in the front plate 37. Nuts 78 are affixed to the inner surface of the flange 72 for receiving screws 80 (or other fasteners) which pass through the apertures 76 in the riser plate 37 of one modular unit 30 and the apertures 74 in the flange 72 of another modular unit 30 to secure the front plate 30 of the upper modular unit to the joiner plate 38 of the lower modular unit.

The joiner plate 38 is also provided with one or more apertures 82 for receiving electrical connections and/or other connections from a modular unit mounted on the joiner plate 38. For example, if a tower is mounted on the modular riser unit 30 and one of the lower modules or base modules requires electrical power for a warming unit, connection to the base module may be made through the apertures 82.

It can be seen that the design of the interlocking assembly described relative to the riser unit 30 facilitates the manufacturing and mass production of the several modular units. Each modular unit includes an interlocking assembly of the type described. Thus, the modular components may be easily, accurately and predictably joined together by spot welding, riveting or by screw fasteners.

It is noted that the flange 72 can be provided at the front or the back of the modular unit. Modular units having the same orientation may be used together. In the embodiment illustrated in FIGS. 1 and 2, the riser plate 37 of the module is at the back of the brewer unit. This orientation places the visible screw connections at the rear of the brewer unit to provide a smooth, clean appearance when viewed from the front of the brewer unit.

Figure 5:
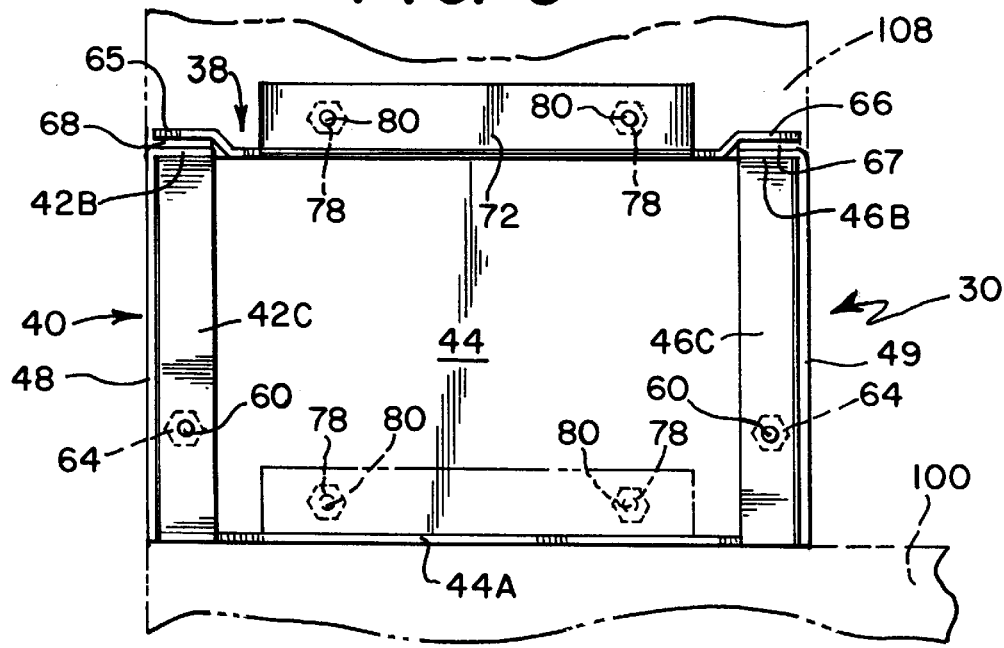
FIG. 5 is an elevation view of the modular riser element shown in FIG. 4 in interlocking relationship with other modules of the apparatus.

Referring now to FIG. 5, there is shown a representation of an assembly comprising a support base 100, a riser unit 30 and a tower 108 (or other similar modular component). As suggested, the modular units can be assembled in any number of arrays. To assemble a group of modular units one-on-top-of the other, the riser plate 37 of the upper module 30 is removed from its usual position at the front (or back) of the module 30 by removing the screws 80 and sliding the riser plate 37 upward. This action releases the downward-directed lip 54 (see FIG. 4) of the plate 37 from the flanges 42C and 46C of the module frame 40. The upper module, e.g. a tower 108, is mounted to the top of the riser modular unit 30 by sliding the inward facing lower flanges 42A and 46A of the tower module 108 into the channels 68 and 70 (formed between inward directed flanges 42B and 46B and the borders 65 and 66 of the joiner plate 38) of the modular unit 30 until the tower (or upper) module is in position directly over the lower module. The riser plate 37 of the upper module is then replaced in the upper module by sliding the lip 54 downward over the flanges 42C and 46C of the upper module to position the riser plate at the front (or rear) of the upper module.

The riser plate 37 is then secured to both the upper and lower modules. Specifically, the riser plate 37 is secured to the frame of the upper module by screws 80 which pass through the apertures 62 in the riser plate, apertures 60 in the flanges 42C and 46C, and nuts 64 affixed to the back of flanges 42C and 46C. The riser plate 37 is also secured to the flange 72 of the joiner plate 38 of the lower module 30 by screws which pass through apertures 76 in the riser plate, apertures 74 in flange 72, and nuts 78 affixed at the back of the flange 72. Thus, an upper module 108 may be easily and securely mounted on a lower module 30. All modules, including the tower modules, may be joined in the foregoing manner.

In similar fashion, a lower module, e.g. a base 100, can be attached to the riser module unit 30.

Figure 6:
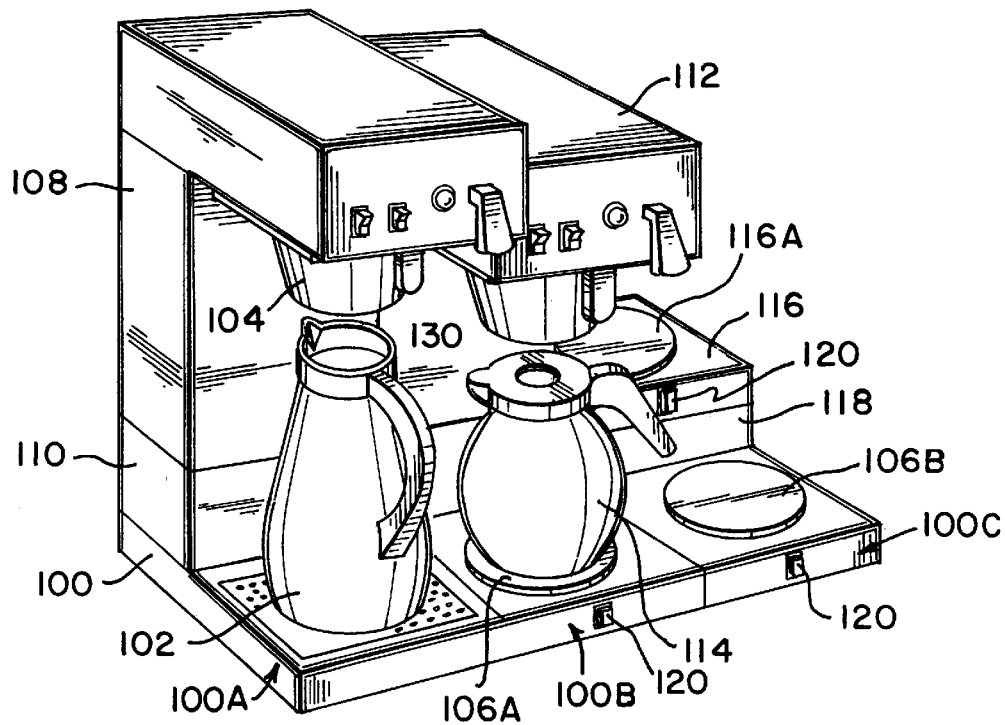
FIG. 6 is an exemplary embodiment illustrating one possible configuration of the modular brewing apparatus of the present invention.

FIG. 6 illustrates one possible configuration of the modular brewing apparatus of the present invention to demonstrate the versatility of the brewing apparatus of the present invention. The unitary base module 100 has three side-by-side sections 100A, 100B and 100C. Section 100A is a standard base which is intended to function merely as a support for a non-warmed vessel (such as an airpot 102)

under the brew cone 104. Sections 100B and 100C include conventional warming units 106A and 106B. It is understood that base 100 can consist of more (or fewer) sections or areas of operation. Moreover, while generally not the typical construction, the base 100 could comprise a plurality of separate base modules joined together in any suitable fashion.

A tower module 108 is mounted on an appropriate riser module 110 which is, in turn, mounted on the base module 100 adjacent base section 100A to provide a brewing station of appropriate height to accommodate the airpot vessel 102.

A tower module 112 (similar to tower module 108) is mounted directly on the center section 100B of base 100 to provide a brewing station of appropriate height to accommodate a standard glass vessel 114. In this case, the riser 110 is omitted.

A separate warming base 116 including a warming unit 116A is mounted on riser module 118 (which can be similar to riser module 110). The riser module 118 is, in turn, mounted on section 100C of base 100. This arrangement provides a raised warming station adjacent to warming station 100C for glass vessels with a brewed beverage therein. Each warming unit 106A, 106B and 116A has an individual on/off control 120 and is supplied electrical power through corresponding apertures (not shown) in the base units via apertures in either of tower modules 108 or 112.

It is to be understood that tower 112, while shown as a beverage dispensing tower, can also represent a coffee bean grinder (or any other suitable accessory and/or attachment). In this attachment, coffee beans are introduced into the top of the tower, passed through a grinding mechanism, and retrieved in a suitable container represented by the device 130.

As noted, any other suitable accessory can be mounted to the common base 100, a riser 110 or any other component of the universal brewing system described herein.

The modules 30 of the foregoing design are easily manufactured and are suitable for large scale production. Furthermore, they provide a strong modular structure. The ease of assembly/disassembly of the overall system facilitates cleaning to promote a sanitized beverage station. It can further be seen that the modular configurations of the modular brewing apparatus are almost unlimited. A user or distributor can easily assemble a large variety of modular units, including modular units of different heights, to configure the brewing apparatus system to accommodate almost any setting or configuration.

While the preceding description has been directed to particular embodiments of a modular brewing system, it is understood that those skilled in the art may conceive modifications and/or variations to the specific embodiments shown and described herein. Any such modifications or variations which fall within the purview of this description are intended to be included herein as well. It is understood that the description herein is intended to be illustrative only and is not intended to limit the scope of the invention. Rather the scope of the invention described herein is limited only by the claims appended hereto.

I claim:

1. A modular beverage brewing apparatus including,
    a brewing head unit,
    a support unit, and
    a connection unit for selectively mounting said brewing head unit to said support unit,
    said connection unit includes channel defining means having inwardly directed surfaces and raised outer edges, said channel defining means attached to one of said support unit and said brewing head unit in order to receive interlocking tab means attached to the other of said support unit and said brewing head unit within the channel defined by said channel defining means.

2. The apparatus recited in claim 1 wherein,
    said connection unit includes a spacer unit for spacing apart said brewing head unit and said support unit.

3. A modular beverage brewing apparatus comprising,
    a modular brewing head unit including inwardly directed flanges at the bottom thereof;
    a modular base unit; and
    connector means for joining said modular base unit and said modular brewing head unit;
    said connector means including:
        frame means having a plurality of walls; and
        inwardly directed surfaces at the top of said walls;
        a joiner plate having raised borders on at least two opposing edges thereof;
        said joiner plate disposed so that said raised borders are disposed over said inwardly directed surfaces to form a narrow channel between said surfaces and said borders;
        said inwardly directed flanges adapted to be retained in said narrow channel.

4. A modular beverage brewing apparatus comprising,
    a modular brewing head unit;
    a modular base unit; and
    connector means for joining said modular base unit and said modular brewing head unit;
    said connector means including:
        a joiner plate having raised borders on two opposing sides,
        said joiner plate disposed on said modular base unit so that said raised borders are disposed over a surface of said modular base unit to form a narrow channel therebetween,
        said joiner plate having a vertical flange at one end thereof transverse to said two opposing sides; and
        inwardly directed flanges at the bottom of said modular brewing head unit;
        said inwardly directed flanges adapted to be retained in said narrow channel.

5. The modular beverage brewing apparatus recited in claim 4 wherein,
    said modular brewing head unit includes a cantilevered head unit joined to a tower unit.

6. The apparatus recited in claim 4 including,
    riser plate means selectively attachable to said connector means.

7. The apparatus recited in claim 6 wherein,
    said riser plate means is selectively connected to said modular brewing head unit while attached to said connector means.

8. The apparatus recited in claim 4 including,
    a second joiner plate having raised borders on two opposing sides,
    said second joiner plate disposed on the top surface of said modular base unit so that said raised borders are disposed thereover to form a second narrow channel therebetween.

9. The apparatus recited in claim 4 wherein, said connector means includes a frame member intermediate said modular base unit and said joiner plate.

10. The apparatus according to claim 4, further comprising an electrical connection between said brewing head unit and said base unit.

11. The apparatus according to claim 10, wherein said electrical connection comprises a first electrical power connection comprising an electrical output on said brewing head coupled to a second electrical power connection comprising an electrical input on said base unit for delivering electrical power from said brewing head unit to said base unit.

12. The apparatus according to claim 11, wherein said electrical connection further comprises an incoming electrical power connection connected to said brewing head for receiving electrical power from an external source.

* * * * *